(12) United States Patent
Lane et al.

(10) Patent No.: US 8,077,028 B2
(45) Date of Patent: Dec. 13, 2011

(54) SYSTEM AND APPARATUS WITH SELF-DIAGNOSTIC AND EMERGENCY ALERT VOICE CAPABILITIES

(75) Inventors: John Evan Lane, Grayson, GA (US); Victor Eugene Sanhdage, Atlanta, GA (US)

(73) Assignee: ABL IP Holding LLC, Conyers, GA (US)

( * ) Notice: Subject to any disclaimer, the term of this patent is extended or adjusted under 35 U.S.C. 154(b) by 608 days.

(21) Appl. No.: 11/706,799

(22) Filed: Feb. 14, 2007

(65) Prior Publication Data

US 2008/0055077 A1    Mar. 6, 2008

Related U.S. Application Data

(60) Provisional application No. 60/773,707, filed on Feb. 15, 2006.

(51) Int. Cl.
 *G08B 25/00* (2006.01)
 *G08B 3/00* (2006.01)
 *G08B 29/24* (2006.01)
 *G08B 17/10* (2006.01)

(52) U.S. Cl. ..... 340/524; 340/514; 340/516; 340/691.2; 340/691.3; 340/692; 340/506; 340/577; 340/628; 704/274; 455/404.2

(58) Field of Classification Search ............... 340/691.1, 340/691.3, 507, 506, 521, 500, 514, 517, 340/524, 691.2, 692; 704/274, 270, 200; 455/404.1, 404.2
See application file for complete search history.

(56) References Cited

U.S. PATENT DOCUMENTS

| 3,916,404 | A |   | 10/1975 | Gouge |
|---|---|---|---|---|
| 4,074,225 | A |   | 2/1978 | Vandeweghe |
| 4,275,274 | A |   | 6/1981 | English |
| 4,283,657 | A |   | 8/1981 | Gordon et al. |
| 4,335,379 | A |   | 6/1982 | Martin |
| 4,453,222 | A | * | 6/1984 | Goszyk ......................... 704/274 |
| 4,531,114 | A | * | 7/1985 | Topol et al. ............... 340/539.1 |
| 4,544,910 | A |   | 10/1985 | Hoberman |
| 4,754,266 | A | * | 6/1988 | Shand et al. ............... 340/691.2 |
| 4,821,027 | A |   | 4/1989 | Mallory et al. |
| 4,872,195 | A | * | 10/1989 | Leonard ......................... 379/40 |

(Continued)

FOREIGN PATENT DOCUMENTS

JP     2005044318 A  *  2/2005

OTHER PUBLICATIONS

Jp-2005-044318 machine translation, Ogawa et al, Fire Alarm, Feb. 2005.*

(Continued)

*Primary Examiner* — George Bugg
*Assistant Examiner* — Anne Lai
(74) *Attorney, Agent, or Firm* — Kilpatrick Townsend & Stockton LLP (57) ABSTRACT

An emergency alert system with the capability of providing audible alerts upon the detection of a possible emergency condition or a malfunctioning system component is provided. An audible alert may include voice phrases that are selected and output based, at least in part, on information associated with the possible emergency condition or malfunctioning system component. The noise in an area may be received and the volume of the outputted voice phrase may be changed based, at least in part, on the noise in the area.

18 Claims, 10 Drawing Sheets

U.S. PATENT DOCUMENTS

| | | | |
|---|---|---|---|
| 4,894,642 A | 1/1990 | Ashbaugh et al. | |
| 5,151,679 A | 9/1992 | Dimmick | |
| 5,315,502 A * | 5/1994 | Koyama et al. | 700/79 |
| 5,646,502 A | 7/1997 | Johnson | |
| 5,663,714 A * | 9/1997 | Fray | 340/692 |
| 5,696,487 A * | 12/1997 | Choi | 340/532 |
| 5,697,175 A | 12/1997 | Schwartz | |
| 5,739,639 A | 4/1998 | Johnson | |
| 6,281,791 B1 * | 8/2001 | Murao | 340/524 |
| 6,481,870 B2 | 11/2002 | Son | |
| 6,502,044 B1 | 12/2002 | Lane et al. | |
| 6,518,878 B1 * | 2/2003 | Skoff | 340/506 |
| 6,529,128 B2 * | 3/2003 | Weng | 340/539.1 |
| 6,784,798 B2 | 8/2004 | Morris | |
| 6,802,277 B1 | 10/2004 | Clay et al. | |
| 6,873,837 B1 * | 3/2005 | Yoshioka et al. | 455/321 |
| 6,896,388 B2 | 5/2005 | George et al. | |
| 2001/0043144 A1 * | 11/2001 | Morris | 340/692 |
| 2002/0130782 A1 * | 9/2002 | Johnston et al. | 340/628 |
| 2003/0013495 A1 * | 1/2003 | Oleksy | 455/567 |
| 2003/0034885 A1 * | 2/2003 | Catton et al. | 340/506 |
| 2003/0192216 A1 | 10/2003 | Hsu | |

OTHER PUBLICATIONS

Office Action mailed on Aug. 17, 2011 in Canadian Patent Application No. 2,578,890 in the name of ABL IP Holding LLC (4 pages).

* cited by examiner

SYSTEM AND APPARATUS WITH SELF-DIAGNOSTIC AND EMERGENCY ALERT VOICE CAPABILITIES

CROSS REFERENCE TO RELATED APPLICATIONS

The present application claims the benefit of U.S. Provisional Patent Application No. 60/773,707 entitled, "System and Apparatus with Self-Diagnostic and Emergency Alert Voice Capabilities," filed Feb. 15, 2006, the contents of which are incorporated herein by reference.

FIELD OF THE INVENTION

The present invention relates generally to an emergency alert system that provides a voice alert when a possible emergency is detected where the voice alert includes information to enable the building occupants to quickly locate and follow the nearest path of egress out of a building. Additionally, the present invention relates generally to a self-diagnostic component of the emergency alert system that provides a voice alert when a problem is detected with the emergency alert system and provides information on the problem detected.

BACKGROUND OF THE INVENTION

Emergency alert equipment is generally used in buildings, homes, and other structures and locations to notify building occupants of emergency conditions existing in or around the structure. Conventionally, the emergency alert equipment includes a plurality of alert devices located throughout the building with the ability to provide an alert by sounding a loud noise and/or flashing bright lights when emergency conditions are detected. Emergency conditions may be detected by sensors, such as a smoke detector, carbon monoxide detector, or temperature detector, located throughout the structure or emergency switches that may be triggered by the building occupants upon observing an emergency condition. These sensors and triggers are typically in electrical communication with the alert device in order to notify the alert device when an emergency condition exists.

Emergency alert systems may also include emergency exit indicators that are commonly located close to designated emergency exits and include an exit sign that illuminates when the emergency alert device is in an alert mode. In a typical emergency alert operation, the emergency exit sign flashes at a 1 Hz rate and provides a 1 Hz beep or other similar noise giving an audible indication of where the exit is located. Conventional emergency alert systems, however, simply emit tones from buzzers and beepers and provide flashing lights. They do not provide any useful information to building occupants relating to the appropriate route to follow in order to evacuate the building. If a large amount of smoke or fire prevents building occupants from seeing an emergency exit sign, the occupants may be unable to find an appropriate exit route.

Emergency alert systems also include a micro-controller for receiving information concerning possible emergency conditions existing, the charge of the battery, condition of any emergency lamps and sound devices, circuitry connecting the various components of the emergency alert system, and the voltage level from the building's electrical system. The micro-controller may also perform a self-diagnostic test on the emergency alert system's various components, including ensuring that the temperature, battery voltage, battery charger voltage, lamp and charge current, and the building's electrical power voltage stay within pre-set criteria levels. If the self-diagnostic test indicates that one or more of the tested values are outside the pre-set criteria levels, the emergency system may alert maintenance personnel or building occupants of the problems found during self-diagnostic testing. Conventional methods for alerting maintenance personnel or building occupants include displaying flash codes with a light emitting diode (LED) display that may be correlated by the personnel or occupants to indicate the problem or sounding a beeper or buzzer to indicate that a problem has been detected by the self-diagnostic system.

Conventional emergency alert self-diagnostic systems, however, do not clearly indicate the presence of component failures to personnel or occupants. For example, building occupants and building maintenance personnel are often confused by codes displayed on the LED display that indicate a problem with the emergency alert system. Furthermore, visual indicators, such as an LED display, often go unnoticed because the emergency alert systems are located in remote areas of the building and building maintenance personnel do not perform routine checks of the emergency systems. Additionally, emergency alert systems are often located at height levels that prevent the display from being observed. Beeps or buzzers that indicate a problem with the emergency alert system often confuse maintenance personnel and building occupants since they fail to clearly indicate the type of problem being detected by the self-diagnostic system.

Therefore, a need exists for an emergency alert system that provides voice notification and description of the problem detected by the self-diagnostic component and a voice alert that is activated during a detected emergency that provides building occupants with the ability to quickly locate and follow the nearest path of egress out of the building.

SUMMARY OF THE INVENTION

Accordingly, certain exemplary embodiments of the present invention provide an emergency alert system with sensors for detecting dangerous conditions inside and/or around a building and manually triggered switches for providing building occupants with the ability to provide the emergency alert system with notice that a dangerous condition may exist. The sensors may be able to detect the presence of smoke, abnormally high temperatures, carbon monoxide, or any other condition that might pose a danger to life or property. The sensors and manually triggered switches may be electrically connected to one or more emergency alert devices and provide the emergency alert devices an indication that a possible dangerous condition exists. Once the emergency alert devices receive the indication, they may provide a visual and audible alarm that notifies the building occupants of the possible presence of a dangerous condition.

In certain embodiments of the present invention, the emergency alert devices include a micro-controller that contains information about the nearest exit path for building occupants and/or receives information related to the presence, type, and location of a possible dangerous condition. The micro-controller may also communicate with a programmable electronic voice storage device and send a command that is correlated to certain voice audio content based on the information obtained concerning the presence, type, and location of a possible dangerous condition and the nearest exit path. The electronic voice storage sends the particular voice audio through an audio amplifier that is controlled by the micro-controller to a speaker in order to be heard by the building occupants. The voice audio may contain instructions for building occupants concerning the location of the nearest exit path and the location and type of possible dangerous condition. The voice audio may be provided in addition to flashing lights and/or high volume noises to notify building occupants of the possible presence of a dangerous condition.

In some embodiments of the present invention, the micro-controller receives information concerning the noise level existing around particular location of the emergency alert device. Depending on the noise level around the particular emergency alert device, the micro-controller may manipulate the audio amplifier to ensure that the building occupants will hear the voice audio and/or other audio notification signal.

Certain other embodiments of this invention include emergency alert devices with self-diagnostic capabilities. The self-diagnostic may be performed by self-diagnostic circuitry in the emergency alert devices. The self-diagnostic circuitry receives information concerning various measurable aspects of the entire emergency alert system, including the sensors and emergency alert devices, and compares that information to pre-set criteria. Measurable aspects may include the temperature, battery voltage, battery charger voltage, lamp and charge current, and the building's electrical power voltage. A possible problem with the emergency alert system is indicated if the measurable information falls outside the pre-set criteria. If a possible problem is indicated, the self-diagnostic system provides the micro-controller with information concerning the problem. Such information may include the type and location of the possible problem.

The micro-controller may convert the information into electrical signals representing a voice. The micro-controller may be programmed to send the electrical signal to an electronic voice storage device. The electronic voice storage may convert the electrical signals into an audible voice signal that relates to the type and location of the possible emergency alert system or light fixture problem. In addition, the electronic voice storage may receive and convert signals from the micro-controller relating to the existence of a possible problem with the emergency alert system to a voice audio. The electronic voice storage sends the information through an audio amplifier, controlled by the micro-controller, to a speaker in order to notify building occupants and maintenance personnel of a problem with the emergency alert system. For instance, the voice audio may initially announce that there is a problem with the emergency alert system and then indicate the type, such as a dead battery, and location. Therefore, building occupants and/or maintenance personnel may be quickly and accurately notified when a problem with the emergency alert system arises.

Advantages of certain aspects and embodiments of the present invention include providing verbal announcements of possible problems detected by the self-diagnostic system. Additionally, certain aspects and embodiments provide components that announce pre-selected information when the emergency alert system detects a possible emergency. Furthermore, certain aspects and embodiments of the present invention provide audio instructions and identification of the nearest exit and/or exit path during an emergency. Some embodiments may provide a controllable circuitry that that may be manipulated, based on the surrounding noise level, to increase the volume of audio signals and voice messages such that the building occupants may hear any messages or audio signals from the emergency alert device. Finally, certain aspects and embodiments of the present invention provide audio information about a pre-selected path that is the nearest exit for building occupants.

DETAILED DESCRIPTION OF THE INVENTION

Figure 1:
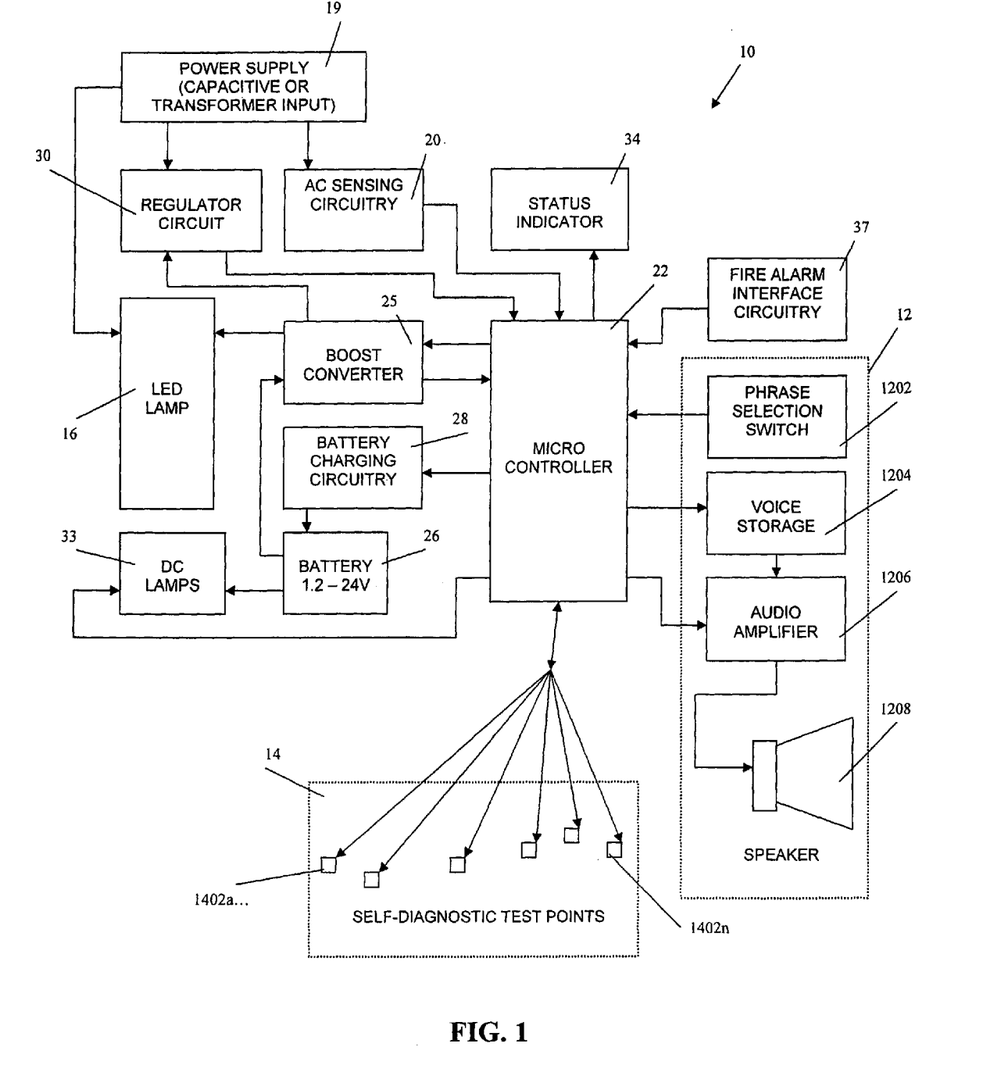
FIG. 1 schematically shows a block diagram of an emergency alert system according to one embodiment of the present invention.

FIG. 1 shows one embodiment of a voice alert system 12 and self-diagnostic system 14 along with the other components of an emergency alert system 10. The emergency alert system 10 generally includes components that sense the possible existence of emergency conditions, either automatically using sensors or manually using a switch operated by a human.

The emergency alert system 10 includes LED lamps 16 that preferably form an array of LED lights arranged in series. The LED lamps 16 are operated under normal, non-emergency conditions through the power supply 19. One example of such power supply 19 is a transformer or capacitor network that is used to change the building's electric alternating current (AC) power into direct current (DC) power. The system may also include normal line voltage circuitry 20 for sensing the presence of AC line voltage from the power supply 19 to the LED lights 16 through an input signal fed to the normal line voltage circuitry 20 from the power supply 19. The normal line voltage circuitry 20 then feeds a signal correlating to the electric parameters of the power supply 19 power to a micro-controller 22. The micro-controller 22 controls boost converter 25 to supply power to the LED lamps 16 upon discontinuation of power from the power supply 19. Upon such a discontinuation of power from the power supply 19, a battery 26 provides power to the boost converter 25. The micro-controller 22 also controls a battery charging circuit 28 by changing the battery charging circuit 28 between a "charging" state to a "standby" state. The micro-controller 22 is normally powered by the power supply 19 through a regulator circuit 30 and by the battery 26 through the boost converter 25 upon discontinuation of power from the power supply 19.

The emergency alert system 10 may also include DC lamps 33 for additional illumination and notification when a possible emergency is detected. The DC lamps 33 are powered by the battery 26 and are controlled by the micro-controller 22.

The micro-controller 22 receives input status indicator circuitry 34 and fire alarm interface circuitry 37. The status indicator 34 may include an LED and circuitry able to detect the operating status (i.e. on/off) of the emergency alert system and send the information to the micro-controller 22. The LED may provide information such as whether the emergency alert system 10 is on or off. In some embodiments of the present invention, the fire alarm interface circuitry 37 receives input signals from emergency sensors, such as a smoke detector, heat detector, and carbon monoxide detector, and manually triggered switches, all located throughout the building. These input signals may indicate the presence, location, or type of possible emergency conditions. The fire alarm interface circuitry 26 may send the received signals to the micro-controller 22 where the micro-controller 22 uses the information to control other components of the emergency alert system 10 for notifying building occupants of the possible emergency.

As stated above, the emergency alert system 10 also includes a voice alert system 12. The voice alert system 12 preferably provides voice information and commands based on the signals from the fire alarm interface circuitry 37. For instance, the micro-controller 22 receives a signal from the fire alarm interface circuitry 37 indicating a possible emergency. The micro-controller also receives information from a phrase selection switch 1202. Upon installation in a building, the phrase selection switch 1202 is set to the phrase applicable to the emergency alert system 10 placement and the nearest building exit. For instance, if the nearest exit requires building occupants to make a "left" at the particular emergency alert system, the installer will select the "turn left" phrase with the switch.

The micro-controller then sends the selected directional phrase and commands to voice storage 1204, selecting additional phrases based on the information from the fire alarm interface circuitry 37 and directing the voice storage 1204 to send the voice phrases to an audio amplifier 1206. The audio amplifier 1206 controls the volume of the appropriate phrases from the voice storage 1204 and phrase selection switch 1202 and is controlled by the micro-controller 22. The audio amplifier 1206 then sends the phrases to a speaker 1208, which broadcasts the phrases to the building occupants.

Examples of the types of voice phrases that may be used to alert building occupants include, "fire in the south kitchen, please turn left to exit," "smoke in the $1^{st}$ quadrant, please go straight ahead to exit," or just "exit right." There are an infinite number of phrases and commands that may be broadcast through the speaker by the voice alert system 12. Preferably, the voice phrases, except for exit directional commands, are stored in a digital format in the voice storage 1204 and sent to the audio amplifier 1206 based on commands from the micro-controller 22. The phrase selection switch 1202 preferably inputs a pre-determined phrase into the micro-controller 22 upon the detection of a possible emergency. Alternatively, the exit commands are stored in the phrase selection switch 1202 and are accessed by the micro-controller upon the presence of a possible emergency. Alternatively, a computer, based on information from the micro-controller 22, generates the appropriate phrases.

The emergency alert system 10 further includes a self-diagnostic system 14 that detects when one or more components of the emergency alert system 10 is not operating properly and, along with the voice alert system 12, provides voice information concerning the defective component. The self-diagnostic system includes any number of test points 1402*a* . . . 1402*n*. The test points 1402*a* . . . 1402*n* obtain information related to whether the various components of the emergency alert system 10 are working properly and may be located anywhere in the emergency alert system 10. For instance, the test points may obtain information concerning the temperature of the emergency alert system 10, the battery 26 voltage level, the battery charging circuitry 28 voltage level, the LED lamp 16 and battery charger 28 current level, test switch, and the AC line voltage level. The obtained information is sent by the test points 1402*a* . . . 1402*n* to the micro-controller 22. The micro-controller 22 processes the information from the test points 1402*a* . . . 1402*n* and sends a command to the voice storage 1204 selecting the appropriate phrase with respect to the information obtained from the test points 1402*a* . . . 1402*n* and directing the voice storage 1204 to send the appropriate phrases to the audio amplifier 1206. The micro-controller 22 controls the audio amplifier 1206, which can change the volume of the phrases. The audio amplifier 1206 sends the voice phrases to the speaker 1208 in order for the building occupants to hear the information.

Examples of voice phrases used based on information from the self-diagnostic system include "dead battery, please replace," "no AC voltage, check connection," or "no charging voltage, replace battery charging circuit." The voice information allows building maintenance personnel to quickly locate and fix the problem with the emergency alert system 10. There are an infinite number of phrases and commands related to self-diagnostic notification that may be broadcast through the speaker by the voice alert system 12. Preferably, the voice phrases are stored in a digital format in the voice storage 1204 and sent to the audio amplifier 1206 based on commands from the micro-controller 22. The exit commands are stored in the phrase selection switch 1202 and are accessed by the micro-controller upon the presence of a possible emergency. Alternatively, a computer, based on information from the micro-controller 22, generates the appropriate phrases based on the particular problem detected by the self-diagnostic system 14.

In one embodiment of the present invention, the micro-controller 22 receives the level of noise in the area around its particular location. Based on the level of surrounding noise, the micro-controller 22 increases or decreases the volume of the emergency or self-diagnostic notification volume with the audio amplifier 1206. For example, if the noise in the area surrounding area around the emergency alert system 10 is high, the micro-controller 22 will adjust the audio amplifier 1206 such that the emergency voice alerts or detected component problem notifications are higher in volume so they will be noticed by building occupants.

FIGS. 2-5*c* show components of an emergency alert system that may be used by certain embodiments of the present invention. FIGS. 2-5*c* are also described in U.S. Pat. No. 6,502,044, titled "Self-Diagnostic Circuitry for Emergency Lighting Fixtures," the entire contents of which are incorporated herein by this reference.

Figure 2:
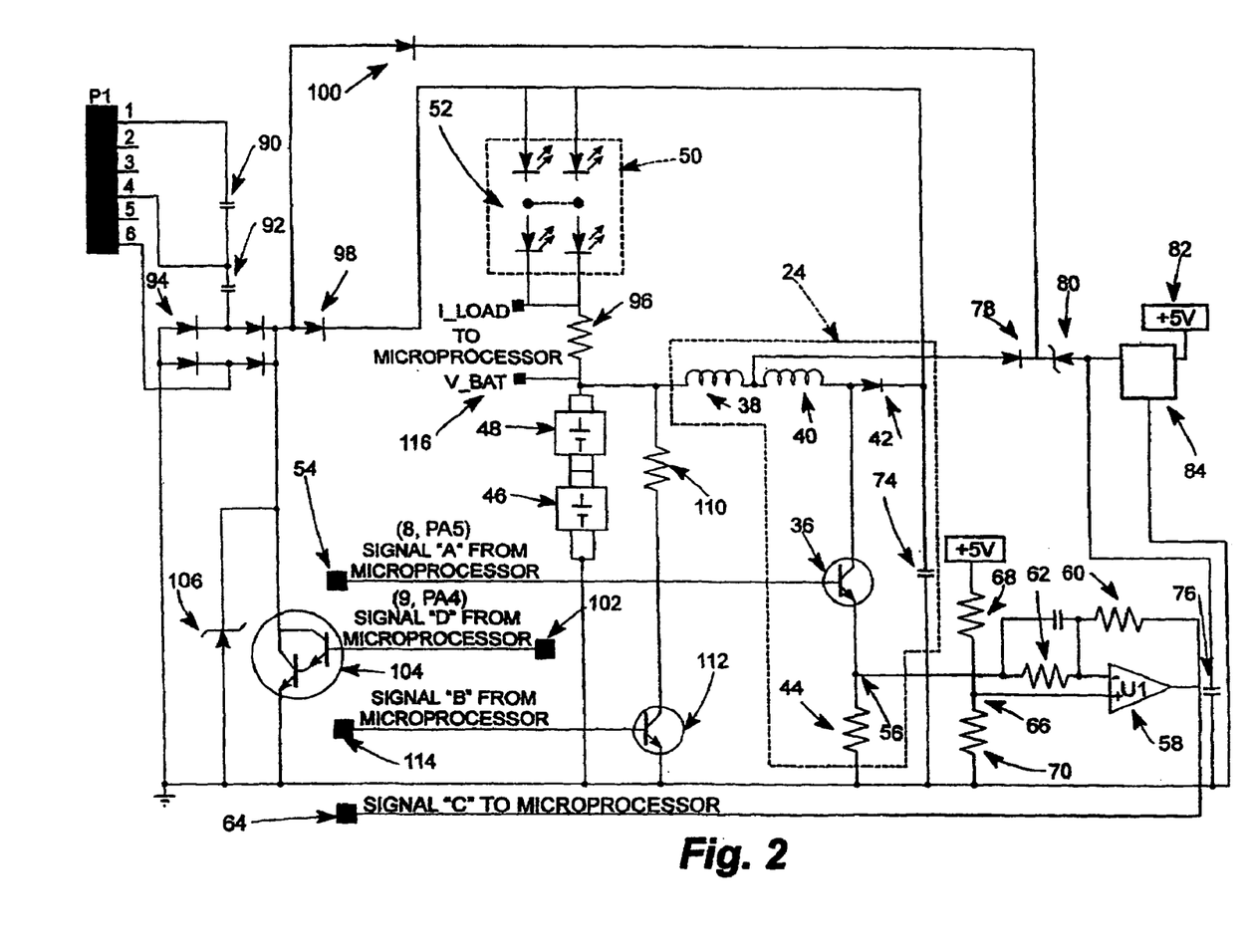
FIG. 2 is a simplified schematic illustrating certain features of the system shown in FIG. 1.

Referring now to FIG. 2, it is seen that a boost converter 24 is comprised in FIG. 2 of transistor 36, inductances 38 and 40, diode 42 and resistor 44. The circuit elements 36 through 44, coupled with batteries 46 and 48 which are preferably NiCd batteries, act to convert a low battery voltage to a higher voltage and are thus capable of driving a light emitting diode lamp 50. Such circuitry is disclosed in U.S. Pat. No. 5,739,639. The light emitting diode lamp 50 comprises an array of light emitting diodes 52 configured in any desired manner including as configured in the aforesaid patent.

The transistor 36 is controlled in response to a software program contained in the microprocessor 18, this control of the transistor 36 being accomplished through the use of a signal at 54 from the microprocessor 18, the microprocessor 18 not being seen in FIG. 2. When signal 54 is driven above 0.7 volts, the transistor 36 turns on and current flows from the batteries 46 and 48 through the inductances 38 and 40, via the transistor 36 and through the resistor 44, thus completing the circuitry to ground. The voltage at 56 therefore rises and is monitored by amplifier 58 with the gain of the amplifier 58 being set by resistors 60 and 62 so as to produce a maximum output, the output being approximately 4 volts, when no current is flowing. As the voltage at 56 rises, the voltage on a signal at 64 falls. At a certain point, as defined by the gain of the amplifier 58, the voltage at 66 set by a resistor divider formed by resistors 68 and 70 (the resistor divider being identified at 72), with that certain point being further defined by the threshold of the Schmitt trigger interrupt input (not shown) of a microprocessor, the certain point being connected to the signal at 64, the microprocessor being interrupted. The microprocessor then turns off the transistor 36 for a predetermined "offtime" by setting the signal at 54 to ground allowing energy stored in the inductances 38 and 40 to be released via the diode 42 into capacitor 74 and, via diodes 78 and 80, into capacitor 76. The microprocessor then turns the transistor 36 back on again, repeating the energy transfer cycle.

Operation of the present system as described hereinabove has advantages over prior art systems employing a simple oscillator in that the peak current through the inductances 38 and 40 is a fixed value regardless of the value of the inductor or load, the only significant variation being caused by the tolerances of the resistors 44, 68 and 70 and a five volt power supply voltage which is regulated, the voltage being indicated at 82. Total variation is therefore around ten percent. By regulating the peak current, the maximum lamp current is regulated and a more consistent light output is maintained.

Using the signal at 54, the microprocessor can therefore determine whether to operate an inverter, that is, the boost converter circuit 20 as required by software operating the microprocessor. Further, the microprocessor determines a desired "OFF time". By varying the OFF time of the inverter, average lamp brightness can be controlled to best advantage in the operation of differing lamps and in view of differing local regulations or differing product variations where lamp brightness can be traded for battery life depending upon relative importance in a given installation. In the present system, the "OFF time" and the variation of "OFF time" during a battery discharge are set by parameters recorded on a product-by-product basis in the memory chip (not shown) of the EEPROM 32 during factory calibration. A software-controlled battery discharge profile can thus be set as necessary, such variation in product capability being achieved essentially at no cost.

Microprocessor control of the inverter involves use of the two inductances 38 and 40 rather than a single inductor as is common in the prior art. In the present system, the inverter also powers the microprocessor and its support circuitry when in emergency mode. The two inductances 38 and 40 form a "split inductor" which allows a lower voltage to be provided to the input of regulator 84 than the voltage which is provided to the lamp 50. As can also be appreciated, the regulator 84 acts to generate the precise five volts required by the microprocessor. Accordingly, addition of two low cost components, that is, the inductance 38 and the diode 78, results in an increase of up to ten percent in overall power conversion efficiency when the inverter is operating, thereby allowing a greater proportion of battery energy to be provided to the lamp 50 to meet lamp brightness requirements as necessary.

Once the inverter of the system ceases to operate as determined by the software of the microprocessor, no power is supplied to the microprocessor or its associated support chips (not shown in FIG. 2). The diode 80, which comprises a Zener diode, blocks the current path from the batteries 46 and 48 via the inductance 38 to the regulator 84 which is the five volt regulator. If a voltage of less than 3.3 volts exists across the Zener diode 80, no current flows. Since the batteries 46 and 48 have a nominal voltage of 1.2 volts each and a realized maximum terminal voltage of approximately 1.4 volts, the Zener diode 80 will never conduct unless the inverter is operating. If the microprocessor is not powered, then the microprocessor does not provide the signals at 54 and at 88 and total power consumption is essentially zero.

Accordingly, no need exists to isolate the terminals of the batteries 46 and 48 during shipping to prevent complete discharge or damage caused by a battery polarity reversal, conditions which can develop with two series cells when one cell becomes completely discharged. Prior art lighting systems require battery isolation by disconnection or addition of a temporary insulator. Control of the inverter through the microprocessor further reduces cost and reduces the possibility of an installation mistake such as by forgetting to remove an insulator (not shown) from an isolation position relative to the batteries 46 and 48.

Advantages derived through use of the EEPROM 32 have previously been alluded to. In addition to maintaining a basic timing cycle, the EEPROM 32 provides additional advantages which include elimination of the use of potentiometers and the manual process of setting such potentiometers in a factory environment. Emergency systems require accurate calibration to ensure that charge voltages and currents are correct, that the system goes into emergency mode at the required mains voltage (80% of nominal) and begins charging at the required voltage (85% of nominal). Calibration software can further be provided to the microprocessor 18, the calibration software interacting with software in automated factory test equipment to store required thresholds in the EEPROM 32. Storage in the EEPROM 32 of configuration parameters allows control of system operation and system features. In addition to the features described above relative to the configuration of "OFF time", certain features are made available only on certain products and it is desirable to be able to easily change the features at the time of manufacture without using differing versions of software running in the microprocessor. This ability is particularly desirable when the microprocessor is "masked" with predefined code during manufacture. The system configured according to the present invention contains 52 bytes of configuration information which the microprocessor software uses to control operation. The invention uses 40 bytes of EEPROM storage to count events such as the number of brownouts and specified tests for later evaluation should a product be returned from the field. Precise evaluation is thus allowed of the performance of the system under actual conditions and allows improvement using such knowledge.

Prior art self-test/self-diagnostic systems typically use a relay to connect an emergency lamp to a battery when power fails and/or to disconnect input power to a charger during diagnostic cycles to check transfer switch operation. Due to the fact that relays are typically expensive, it is therefore desirable to eliminate the use of relays in the first embodiment of the invention if at all possible due in part to use of NiCd batteries as the batteries 46 and 48. Further according to the present invention, and specifically the first embodiment thereof, a number of diodes are used to separate the power to various circuit elements, thereby eliminating the need for a relay. The basic circuit topology of the system is similar to the non-diagnostic emergency system described in the aforesaid patent. In this basic circuitry, an input of 277 volts or 120 volts to either capacitor 90 or capacitor 92 respectively reduces the AC mains voltage, a bridge rectifier 94 converting the mains voltage from AC to DC, the DC current passing through light emitting diodes 52 of the lamp 50 through current measurement resistor 96 and the batteries 46 and 48 before returning to the rectifier 94. It should be understood that a string of the light emitting diodes 52 can be taken to be any desirable number and not be limited to the four light emitting diodes shown in FIG. 2.

The boost converter 24 described previously herein includes the diode 42 in its topology and, by adding diode 98 to the path from the normal power supply, normal power and emergency power can be combined to drive the same lamping, that is, the lamp 50. Power for the electronics of the microprocessor 18 is also derived from the normal power supply via diode 100 and is combined with the output of the inverter, that is, the emergency power, via the diode 78.

Accordingly, both the lamp 50 and microprocessor electronics are effectively powered by either source without the need for a relay. Additionally, microprocessor signal 102 is used to drive a transistor 104 to shunt the AC power source to allow software to perform diagnostic tests. By using the series battery/light emitting diode lamp technology of the aforesaid patent, the total power available from the AC power source can be kept small with easy bypass being possible through use of the small low cost Darlington transistor 104 shown in the circuit. Zener diode 106 is disposed across the transistor 104 for transient voltage protection.

Figures 3, 3A, 3B, 3C:
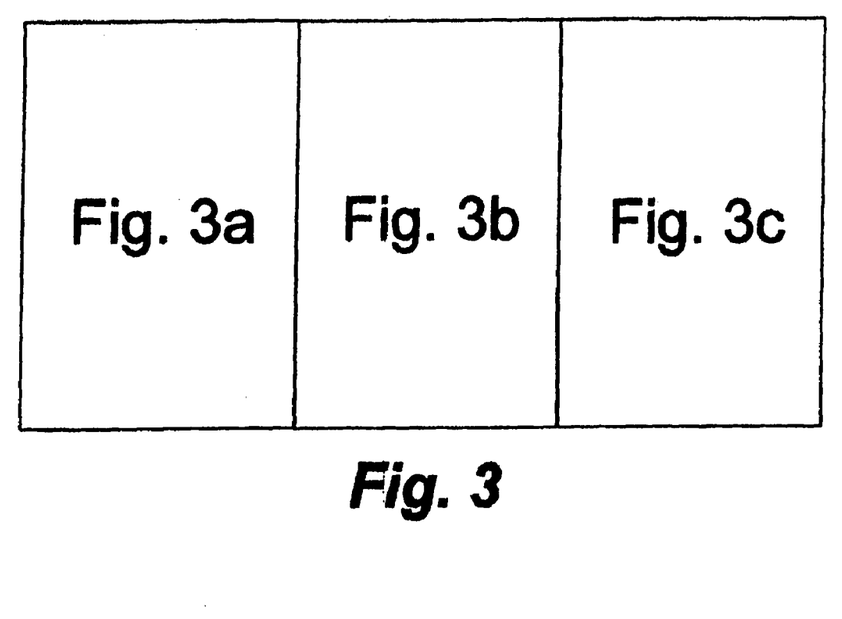
FIG. 3 is a diagram illustrating the relationship of FIGS. 3A, 3B and 3C.
FIGS. 3A, 3B and 3C in combination form a schematic of a charger circuit utilized in the system shown in FIG. 1.
Figure 3A:
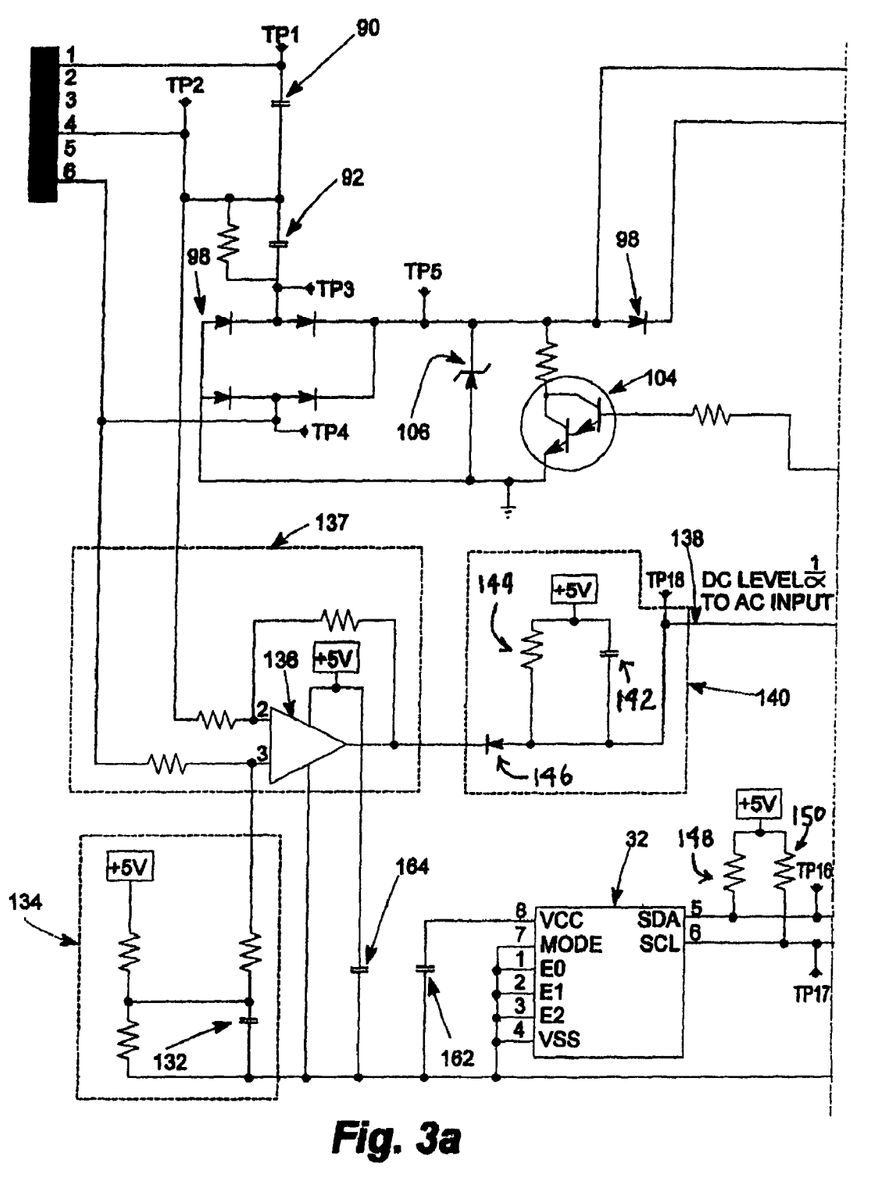
Figure 3B:
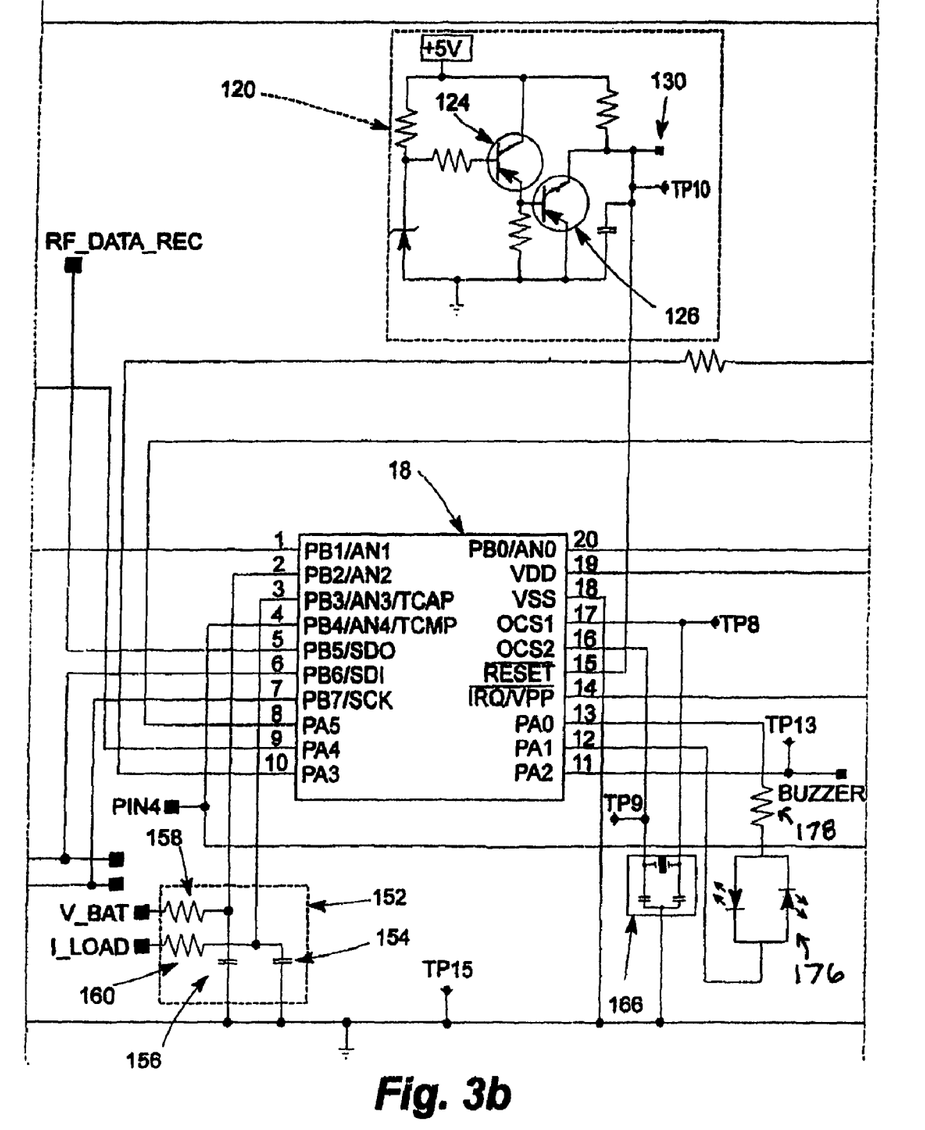
Figure 3C:
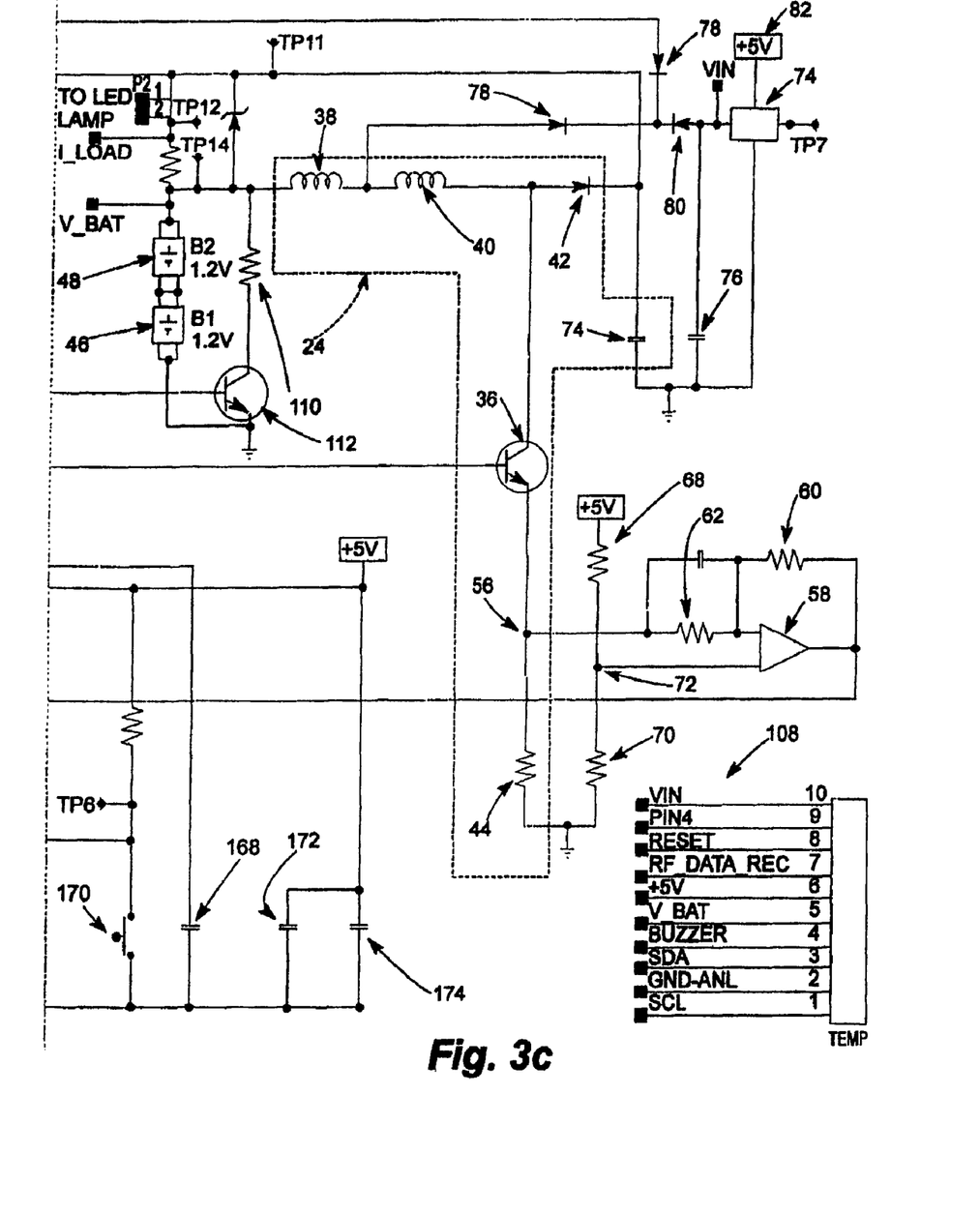
Figure 4:
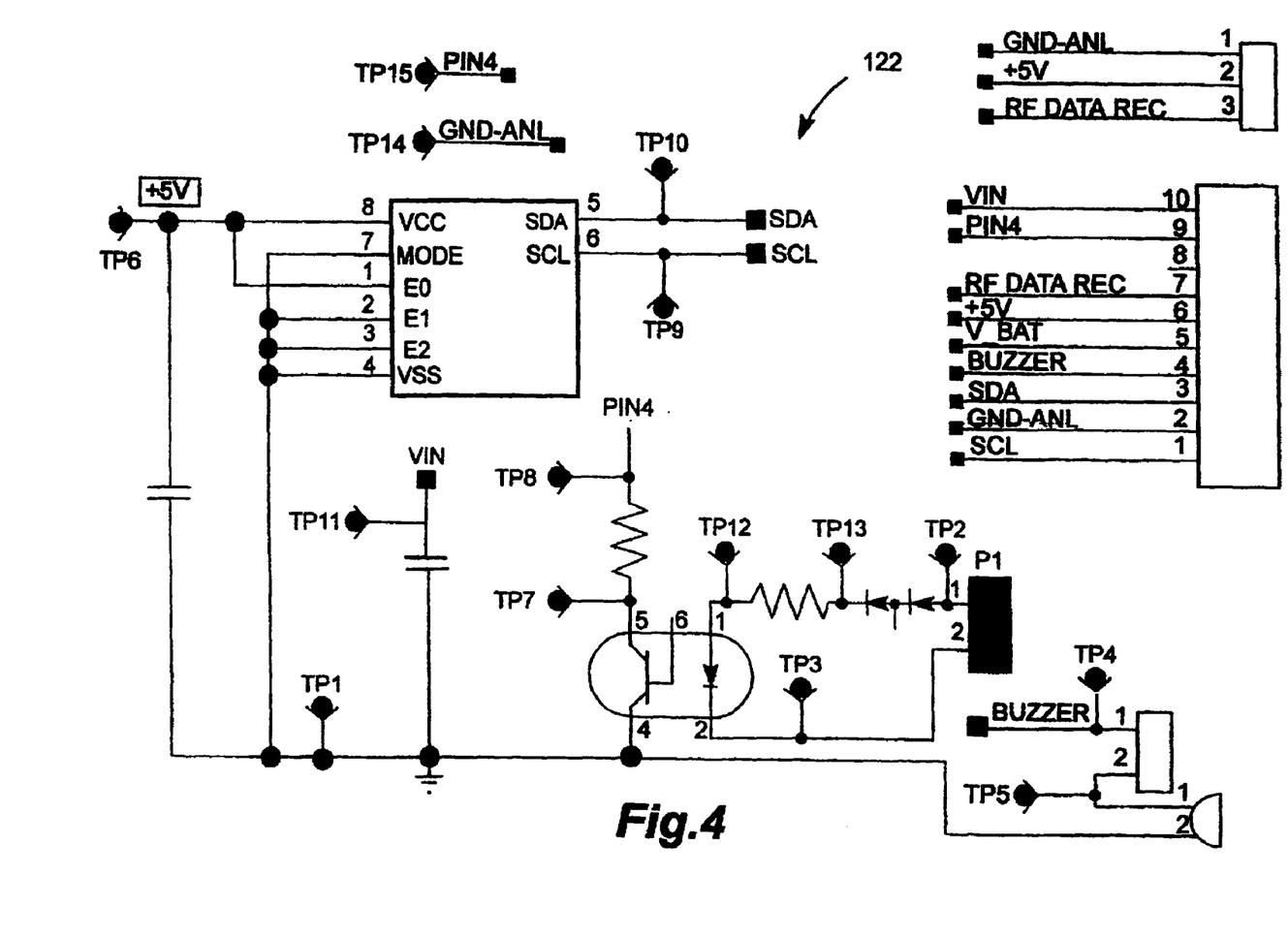
FIG. 4 is a schematic of a self-diagnostic option board.

FIG. 3 is a block diagram showing the relationship of FIGS. 3A, 3B and 3C, which FIGS. 3A, 3B and 3C illustrate in combination certain circuitry utilized in a first embodiment of the invention, the space available on a sheet of drawings being insufficient to allow said circuit to be reproduced on a single sheet. Reference to FIG. 3 herein constitutes a reference to the circuitry shown in the combined illustrations of FIGS. 3A, 3B and 3C. As is seen in FIG. 3, a ten-pin connector 108 can be employed for providing all essential signals and power from the microprocessor 18 to one or more optional circuit boards such as seen in FIG. 4 to provide optional features. As is indicated at 30 in FIG. 1 and in relation to FIG. 3, the connector 108 connects to reset circuitry 120 to provide unregulated DC power for subsystems shown on options board 122 which regulate their own five volt or higher power supplies. The connector 108 further provides a reset signal, regulated five volts for circuits which require five volts, battery voltage for allowing other circuits to monitor battery voltage, a buzzer output seen in FIG. 4 for systems requiring audible alarms and a one-wire serial data connection to a low power radio receiver (not shown) thus allowing remote control devices to be used to trigger self-test or other modes. Various daughter boards providing options can be plugged into the converter 108. Still further, a pair of wires carrying industry standard $I^2C$ data signals from the EEPROM 32 and the microprocessor 18 allow intelligent subsystems to communicate with the self-diagnostic microprocessor. Full charging of a rechargeable battery results in dissipation as heat all the energy taking the form of electric current flowing through the battery cell. Increasing the temperature of a battery cell reduces cell life. Microprocessor control of a shunt battery regulator configured as shown herein in FIG. 2 has as its purpose the reduction in charge current to the minimum required to overcome the effects of self-discharge once the battery is to be charged. The circuitry shown in FIG. 2 is similar to the shunt regulated battery charging system of U.S. Pat. No. 5,646,502, the disclosure thereof being incorporated hereinto by reference. The system of the patent is essentially identical in most respects to the circuitry of FIG. 2 with the exception that the microprocessor 18 controls the process.

Referring again to FIG. 2, it is to be understood that a percentage of the battery charge current through the lamp light emitting diodes 52 via the resistor 96 will flow through the resistor 110 and the transistor 112 when the microprocessor generates a positive voltage above 0.7 volts at signal 114. A circuit is thus provided which allows the microprocessor to reduce the charge current once the batteries 46 and 48 have been charged for a given time or have reached a given voltage as measured at 116. Battery life can be extended substantially by providing such circuitry.

The invention is further understood by reference again to FIG. 3, which includes the circuitry of FIG. 2 therein. As noted above, FIG. 2 essentially illustrates a mains input power circuit section, a boost converter essentially comprising the inverter 20 and lamp and battery configurations. The entire circuitry of FIG. 2 is incorporated into the circuit of FIG. 3. As has been indicated previously, the reset circuitry 120 effectively looks at a five volt line and remains inactive unless a drop occurs on the five volt line. If a drop occurs, the reset circuitry 120 outputs a low pulse which resets the microprocessor 18, the microprocessor 18 being brought back to a given point in the program controlling the self-diagnostic function. Transistors 124 and 126 function with Zener diode 128 inter alia to provide the reset function within the circuitry 120, manual reset at 130 also being provided.

As carryover from the description of the circuitry of FIG. 2, it is to be understood that the transistor 104 is utilized to simulate power outages through turning said transistor on. The transistor 36 essentially comprises the heart of the boost converter 20.

Continuing on with the circuitry of FIG. 3, capacitor 132 is seen to function as a filter capacitor and to provide DC offset at 134, the resistors comprising the DC offset 134 dividing the network to monitor the power line. Operational amplifier 136 effectively detects the level of AC line voltage and connects to DC level by comparison to a reference voltage. At 138, DC level is one/infinity to AC input. Integrator 140 comprised of capacitor 142, resistor 144 and diode 146 is disposed between the operational amplifier 136 and the microprocessor 18 in order to provide appropriate function. Pull up resistors 148 and 150 are provided between EEPROM 32 and the microprocessor 18. DC level filtering is provided at 152 by capacitors 154, 156 and resistor 158, 160. One of the capacitors looking at battery voltage while the other looks at load current to provide a leveling filter function. In essence, the operational amplifier 136 comprises the heart of a difference amplifier 137. The output of the difference amplifier 137 is DC level which is inversely proportional to AC output.

The EEPROM 32 essentially comprises a memory device having a non-volatile program which stores configuration variables used to make decisions. Log variables are also stored by the EEPROM 32 to provide a record of failures and the like. Even if power is discontinued to the EEPROM 32, information is kept even in the absence of battery power or AC mains power. Capacitors 162 and 164 essentially comprise decoupling capacitors which suppress noise. The serial connection between the EEPROM 32 and the microprocessor 18 allows expansion of functionality with other plug-in modules.

Remaining portions of the circuitry of FIG. 3 including a crystal clock 166 comprising a two megahertz resonator providing clocking for microprocessor frequency standards. Timing functions for the analog to digital converter in microprocessor 18 are provided by capacitor 168. Switch 170 is provided for test purposes particularly for testing, rescheduling tests or cancelling tests. Capacitors 172 and 174 stabilize the five volt power supply and bypass high frequencies. Diode arrangement 176 provides bicolor light emitting diodes functioning with resistor 178 as an indicator circuit.

In essence, the microprocessor 18 comprises integrated circuitry having various control functions. In particular, if the microprocessor 18 detects loss of power, data is stored to the EEPROM 32 in order to save operational history.

Figures 5, 5A, 5B, 5C:
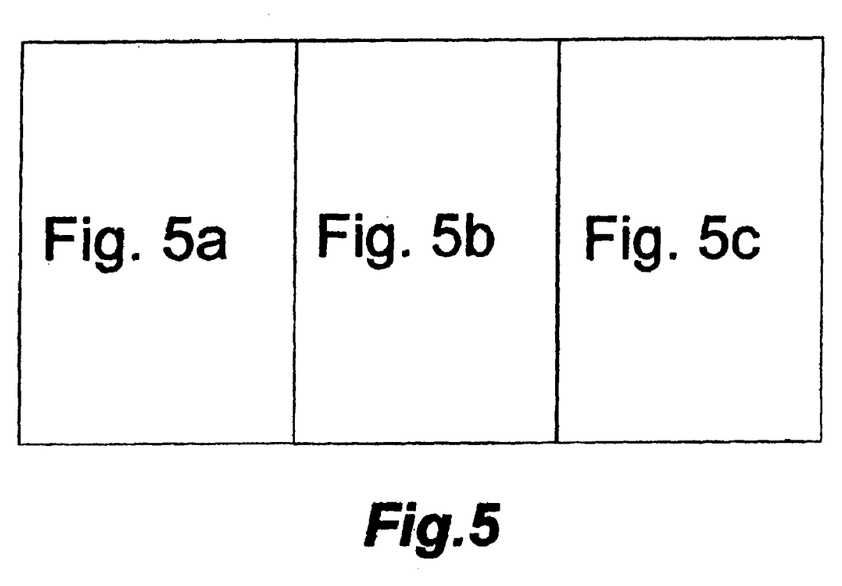
FIG. 5 is a diagram illustrating the relationship of FIGS. 5A, 5B and 5C.
FIGS. 5A, 5B, and 5C in combination form a schematic of a circuit utilized in another embodiment of this invention.
Figure 5A:
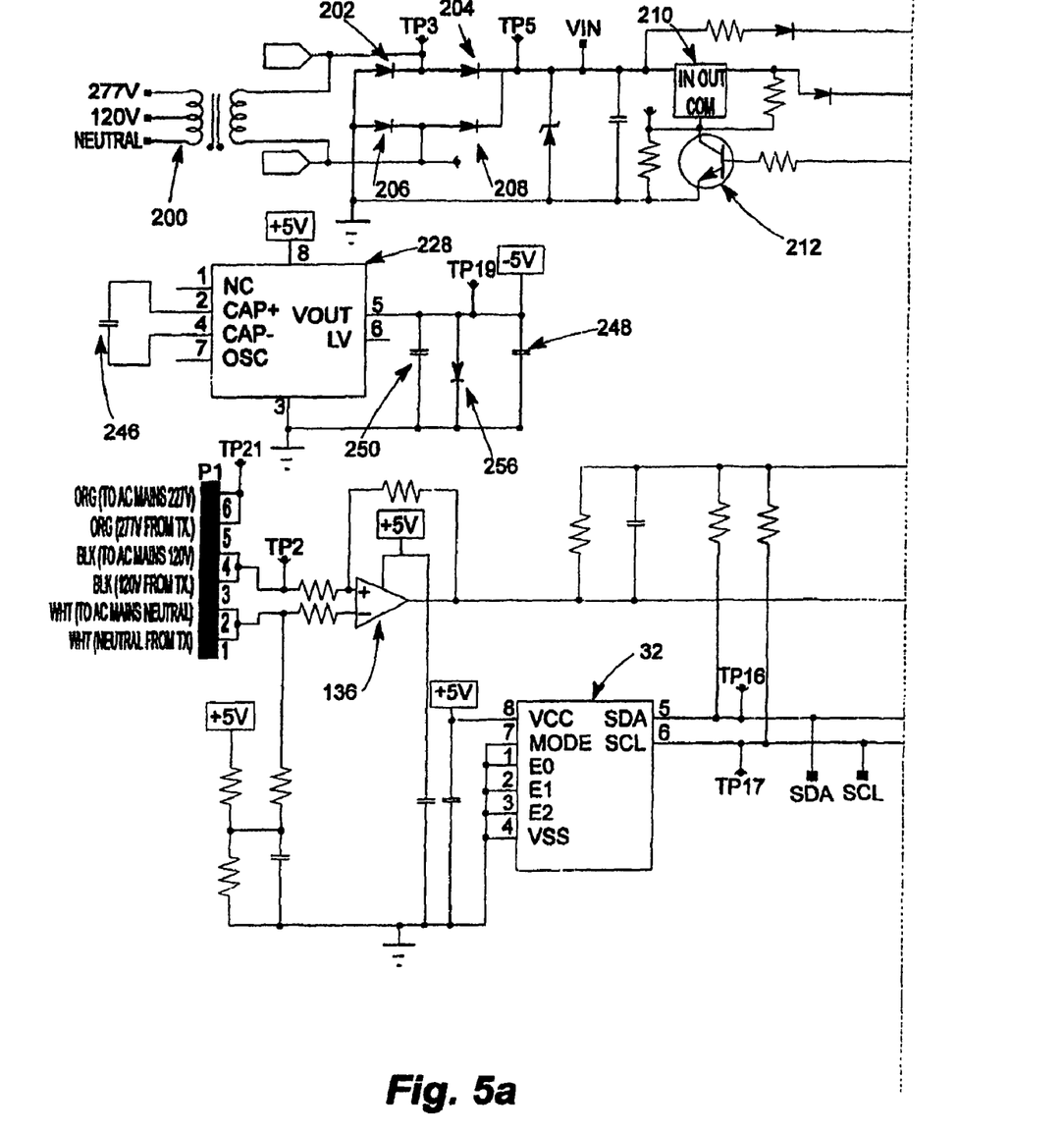
Figure 5B:
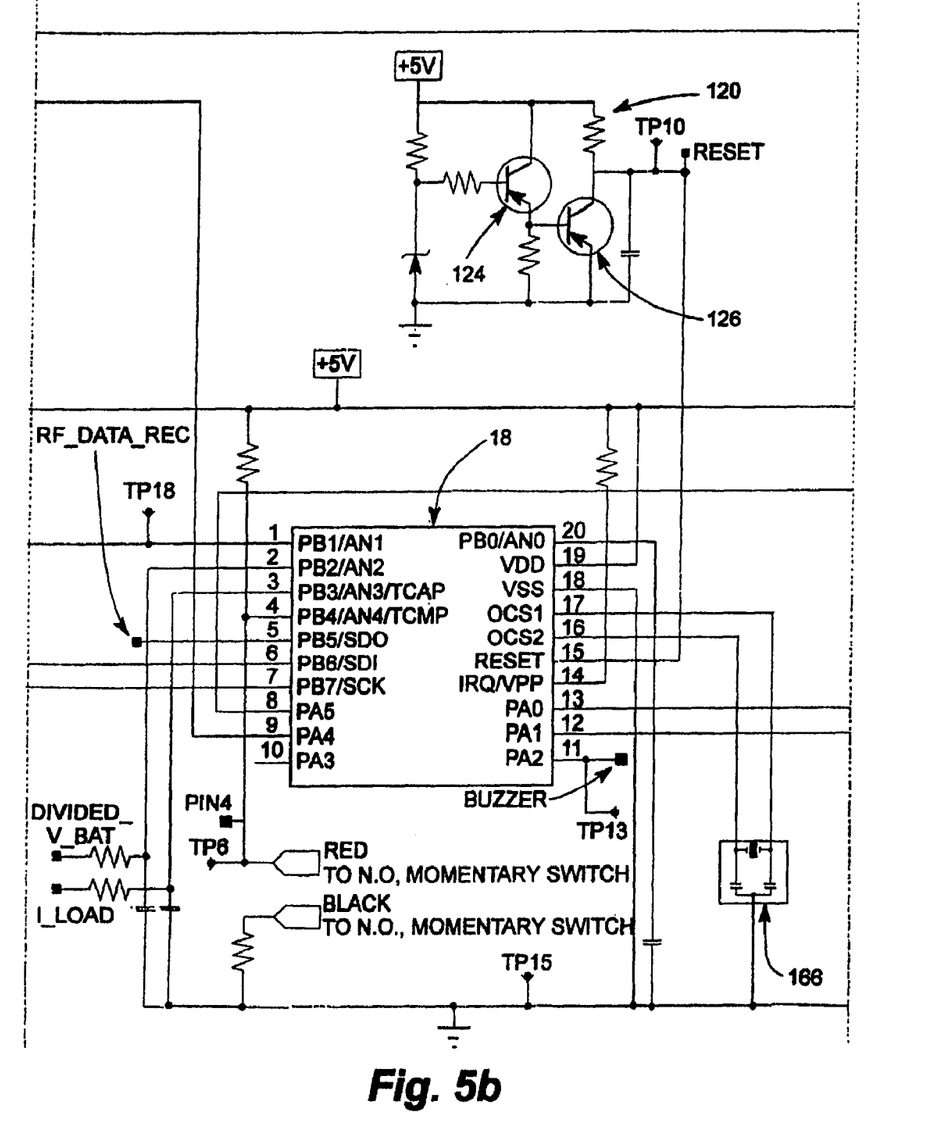
Figure 5C:
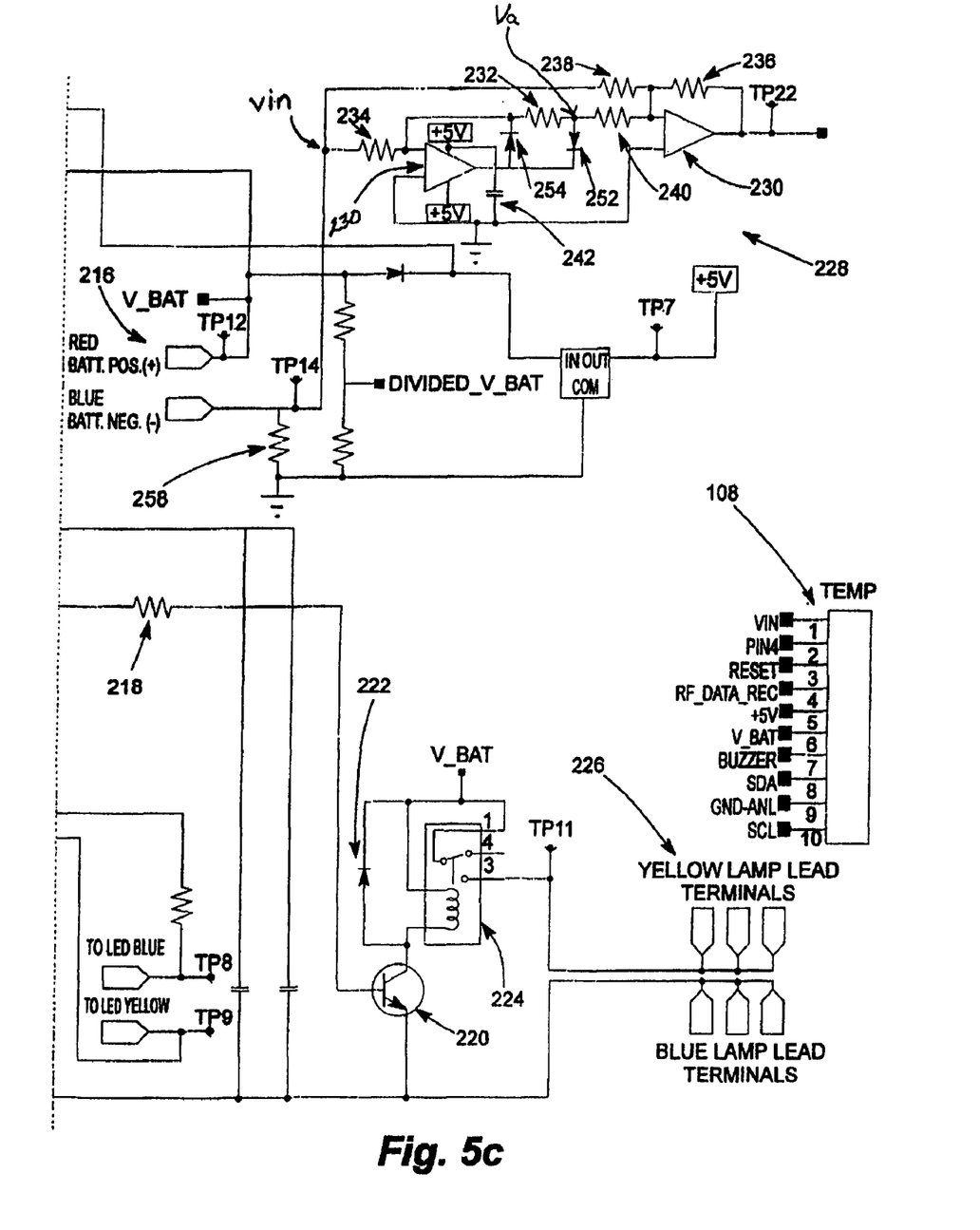

Considering now the second embodiment of the invention as is particularly shown in FIG. 5, it is to be noted that the differences between the circuitry of FIG. 5 and FIG. 3 are related as has been described hereinabove to basic load and battery chemistry considerations as exist between emergency exit signage utilizing light emitting diodes, requiring the circuitry of FIG. 3, and emergency unit equipment utilizing incandescent lamping, requiring the circuitry of FIG. 5. In the circuitry of FIG. 3, nickel/cadmium batteries are utilized as the emergency power source while lead-acid batteries are utilized with the circuitry of FIG. 5.

Much of the circuitry of FIG. 3 is incorporated into the circuitry of FIG. 5, particularly the microprocessor 18 and the EEPROM 32. Further, reset circuitry 120 is essentially identical as are the crystal clock 106 and the connector 108. D.C. local filtering at 152 is produced in a similar fashion and the pull-up resistors operate in a similar manner. The difference amplification function centering on the operational amplifier 136 and associated circuitry is also provided in the same manner as is the D.C. offset function at 134. Other similarities exist between the circuits of FIG. 3 and FIG. 5.

The following description of FIG. 5 is based in part upon differences between the self-diagnostic circuits of FIG. 3 and FIG. 5 respectively.

It is to be understood that FIG. 5 is a block diagram showing the relationship of FIGS. 5A, 5B and 5C, which FIGS. 5A, 5B and 5C illustrate in combination certain circuitry utilized in a second embodiment of the invention, the space available on a sheet of drawings being insufficient to allow said circuitry to be reproduced on a single sheet. Reference to FIG. 5 herein constitutes a reference to the circuitry shown in the combined illustrations of FIGS. 5A, 5B and 5C. For those portions of the circuitry of FIG. 5 which differ from the circuitry of FIG. 3, a more detailed discussion will be provided hereinafter.

The D.C. input capacitors 90 and 92 of FIGS. 2 and 3 comprise an impedance divider network responsible for reducing input voltage and limiting input current to the circuitry of FIG. 3. In FIG. 5, a step-down transformer 200 is employed to produce this function. The transformer 200 combines with bridge rectifier diodes 202, 204, 206 and 208 and voltage regulator 210 to comprise the main current carrying elements of the charger circuitry of FIG. 5. Transistor 212 controls the voltage regulator 210 which is used as a pass element for the charge current in the circuitry of FIG. 5. The microprocessor 18 of FIG. 5 provides a control signal from pin 9 to turn charge current on and off to battery 216 via the transistor 212 and the voltage regulator 210. The software program contained in the microprocessor 18 determines whether this "switch" is on or off. In essence, the software program in the microprocessor 18 is responsible for regulating charge voltage, via pin 9, to a temperature-compensated voltage level, based on charge current and battery voltage that the microprocessor 18 is monitoring, via pins 2 and 3, of the microprocessor 18.

Software control in the circuits of the invention for implementation of charger control is advantageous relative to chargers utilizing hardware for control of voltage regulation set points and temperature compensation adjustment factors. In particular, these advantages include the fact that software control-allows a system to take advantage of the monitoring of battery voltage and current inherent in the self-diagnostic system and utilizes this function for the dual purpose of charge control. Further, such a system is easily configurable to different battery voltage levels and battery chemistries by simply changing configuration variables used by the software program contained in the memory of the EEPROM 32, these configuration variables containing charge voltage level setpoints and temperature compensation factors. Still further, the microprocessor 18 can make use of an internal temperature sensing diode to provide a low cost method of measuring the temperature inside of the unit so that the charger output voltage can be temperature compensated for ambient temperature to maximize battery life at temperature extremes.

Referring back to FIG. 5 in particular, a lamp output section of the circuitry of FIG. 5 consists of a simple relay transfer circuit comprising resistor 218, transistor 220, diode 222 and relay 224. This relay transfer circuit essentially replaces the inverter and peak current detection components of the circuitry of FIG. 3. Pin 8 of the microprocessor 18 is used to turn on and off the relay 224 via the transistor 220 when microprocessor software detects AC power failure or for scheduled self-diagnostics testing. Since the incandescent lamping 226 of FIG. 5 provides a larger DC load in the emergency mode, it is necessary to utilize the relay transfer circuit shown in FIG. 5.

In the circuitry of FIG. 3, a simple current sensing element is provided in the form of the resistor 96. In the circuitry of FIG. 5, a current sensing circuit is seen to be provided by processor 18, amplifier 230, resistors 232, 234, 236, 238, 240 and 258; capacitors 242, 246, 248 and 250; and diodes 252, 254 and 256. A voltage converter circuit is provided by the voltage converter integrated circuit 228 and the capacitors 246, 248 and 250 and diode 256, this voltage converter circuitry 228 providing a −5V rail for the amplifier circuit which is formed around the amplifier 230. The amplifier circuit formed around the operational amplifier 230 is a variation of an active non-saturating, full-wave precision rectifier circuit such as is referred to as an absolute value circuit. The left-hand portion of the circuit is an active-wave rectifier circuit while the right-hand portion of the circuit is an inverting summing amplifier.

In operation, the circuitry of FIG. 5 should first be considered to be in the emergency mode. In this state, the coil of the relay 224 is energized to provide a path for battery current to flow to ground through the lamping 226 which comprise DC lamps. This lamp current by design must flow back into the negative terminal of the battery 216 through sense resistor 258, thereby creating a negative voltage potential with respect to ground at vin. With vin as a negative input voltage, the output va of the left-hand rectifier circuit is va=0. Accordingly, one input to the summing circuit has a value of zero. However, vin is also applied as an input to the summing circuit. The gain for this input is set up by the resistors 236 and 238 and is equal to −5 using the well-know equation for inverting amplifiers −Rf/Ri. Since vin is negative and the gain of the circuit is also negative, the output v0=−5−vin and will be positive for this condition.

When emergency unit equipment utilizing the circuitry of FIG. 5 is powered by alternating current and is charging the battery 216, charge current flows through the battery 216 and the sense resistor 258 to ground, thus creating a positive voltage at vin. In this condition, the output of the left-hand rectifier portion of the circuit va=−vin. The voltage va appears as one input to the summing circuit, and the gain for that input is −15. As before, vin also appears directly as an input to the summing circuit. The net output is then v0=−5vin−15va=−5vin−15(−vin)=10vin. The output of the circuit is therefore positive with a gain of 10 which provides more amplification of the smaller input voltages which will occur once the battery 216 is charged and the current flow is reduced to a trickle charge.

The circuitry thus described provides a number of benefits for accomplishment of the self-diagnostic function. In particular, the microprocessor 18 has the ability to calibrate itself to the output of the circuitry during the manufacturing process, thereby avoiding the use of high tolerance components or trim pots while still maintaining an accurate measurement of current magnitude. Further, the transformation of both negative and positive input voltages to positive output voltages meets the requirement of the microprocessor Analog to Digital (A/D) input requirements for a positive input voltage less than a 3.5V dc. The present circuit also provides the ability to provide a higher gain for smaller voltage drops across the sense resistor 258 when the unit is charging to allow the circuitry to more accurately measure charge current. The ability of the present circuit to provide lower gain when operating in the emergency mode and when the voltage drop across the sense resistor 258 is therefore greater, allows the circuitry to measure the larger currents which flow when the lamping 26 is on without exceeding maximum input voltage on the A/D input of the microprocessor 18. While specific gain values are listed herein, these gain values can change with wattage.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope.

What is claimed is:

1. An emergency alert system comprising:
   a micro-controller configured to receive, through fire alarm interface circuitry from at least one emergency sensor of a plurality of emergency sensors, emergency condition input data comprising a type of a possible or actual emergency condition and a location with respect to the micro-controller of the possible or actual emergency condition;
   a voice alert system in communication with the micro-controller, the voice alert system comprising:
      a voice storage with stored voice phrase data comprising a plurality of voice phrases comprising a first voice phrase including a description of a first exit path and a second voice phrase including a description of a second exit path;
      an audio amplifier configured to receive voice phrase data from the voice storage; and
      a phrase selection switch configured to provide phrase information to the microcontroller;
   wherein the micro-controller is configured to analyze the phrase information and emergency condition input data, select at least one of the plurality of voice phrases from the voice phrase data stored in the voice storage based on the phrase information and based on the type of the possible or actual emergency condition and the location with respect to the micro-controller of the possible or actual emergency condition, and command the voice storage to send the selected at least one of the plurality of voice phrases to the audio amplifier,
   wherein the micro-controller is further configured to analyze data representing a level of noise in an area and send commands to the audio amplifier to control a volume of the selected at least one of the plurality of voice phrases based on the level of noise.

2. The emergency alert system of claim 1, wherein phrase information from the phrase selection switch is manually selected.

3. The emergency alert system of claim 1, wherein the voice phrase data is stored in digital format.

4. The emergency alert system of claim 1, wherein the plurality of voice phrases further comprises a voice phrase representing information about a possible emergency.

5. The emergency alert system of claim 1, wherein the micro-controller is configured to signal the audio amplifier to control the volume of the selected at least one of the plurality of voice phrases.

6. The emergency alert system of claim 1, wherein the voice alert system further comprises a speaker that audibly outputs the selected at least one of the plurality of voice phrases received from the audio amplifier.

7. The emergency alert system of claim 1, further comprising:
   a plurality of self-diagnostic test points configured to automatically monitor during operation of the emergency alert system and detect, from monitoring during operation of the emergency alert system, diagnostic information about problems with the emergency alert system;
   wherein the micro-controller analyzes the diagnostic information and selects a voice phrase from the plurality of voice phrases based on the diagnostic information.

8. The emergency alert system of claim 7, wherein the voice phrase selected from the plurality of voice phrases based on the diagnostic information comprises:
   an identification of a problem with power supplied to at least one component of the emergency alert system.

9. An emergency alert system comprising:
   a plurality of self-diagnostic test points configured to automatically monitor the emergency alert system during operation of the emergency alert system and detect, based on monitoring the emergency alert system, diagnostic information about at least one problem associated with the emergency alert system;
   a voice alert system comprising a plurality of voice phrases; and
   a micro-controller configured to analyze the diagnostic information and, based on the diagnostic information, select at least one voice phrase from the plurality of voice phrases and send a command to the voice alert system to output the selected at least one voice phrase,
   wherein the at least one voice selected from the plurality of voice phrases provides information about the at least one problem associated with the emergency alert system,
   wherein the micro-controller is configured to analyze data representing a level of noise in an area and send commands to the audio amplifier regarding volume of the selected at least one voice phrase based on the level of noise.

10. The emergency alert system of claim 9, wherein the voice alert system comprises:
    a voice storage that stores the plurality of voice phrases;
    an audio amplifier configured to receive the selected at least one voice phrase; and
    a speaker that audibly outputs the selected at least one voice phrase received from the audio amplifier.

11. The emergency alert system of claim 10, wherein the micro-controller is configured to command the voice storage to send the selected at least one voice phrase to the audio amplifier.

12. The emergency alert system of claim 10, wherein the plurality of voice phrases are stored in a digital format.

13. The emergency alert system of claim 9, wherein the selected at least one voice phrase contains information about where the detected problem is located in the emergency alert system.

14. The emergency alert system of claim 9, wherein the selected at least one voice phrase comprises the identification of a malfunctioning emergency alert system component.

15. The emergency alert system of claim 9, wherein the at least one problem associated with the emergency alert system comprises a problem with power supplied to at least one component of the emergency alert system.

16. A method for providing an audible alert associated with an emergency alert system, the method comprising:

automatically monitoring during operation of the emergency alert system for emergency condition input data and diagnostic information associated with the emergency alert system, wherein the emergency condition input data comprises a type of a possible or actual emergency condition and a location of the possible or actual emergency condition with respect to a micro-controller of the emergency alert system, wherein the diagnostic information comprises an indication of a possible or actual problem with the emergency alert system;

detecting emergency condition input data or diagnostic information;

selecting at least one voice phrase from stored plurality of voice phrases based on at least one of (a) the emergency condition input data comprising the type of the possible or actual emergency condition and the location of the possible or actual emergency condition with respect to the micro-controller; or (b) the diagnostic information comprising the indication of the possible or actual problem with the emergency alert system;

receiving data representing a level of noise in an area;

amplifying the selected at least one voice phrase based on the data representing the level of noise in an area; and audibly outputting the selected at least one voice phrase, the selected at least one voice phrase comprising at least one of (i) directional information to direct building occupants away from the location of the possible or actual emergency condition with respect to the micro-controller or (ii) information about the possible or actual problem with the emergency alert system.

17. The method of claim 16, further comprising:

manually selecting the plurality of voice phrases to be stored.

18. The method of claim 16, wherein the plurality of voice phrases comprise at least one of information about a possible emergency, information about an exit path, identification of a malfunctioning emergency alert system component, and location of a malfunctioning emergency alert system component.

* * * * *